(12) United States Patent
Shizuku (10) Patent No.: US 11,920,295 B2
(45) Date of Patent: Mar. 5, 2024

(54) ELASTOMER REINFORCEMENT CORD

(71) Applicant: BRIDGESTONE CORPORATION, Tokyo (JP)

(72) Inventor: Takahisa Shizuku, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 218 days.

(21) Appl. No.: 17/289,781

(22) PCT Filed: Oct. 29, 2019

(86) PCT No.: PCT/JP2019/042419
§ 371 (c)(1),
(2) Date: Apr. 29, 2021

(87) PCT Pub. No.: WO2020/090834
PCT Pub. Date: May 7, 2020

(65) Prior Publication Data
US 2021/0395947 A1 Dec. 23, 2021

(30) Foreign Application Priority Data
Oct. 30, 2018 (JP) .................................. 2018-204361

(51) Int. Cl.
*D07B 1/06* (2006.01)
*B60C 9/00* (2006.01)

(52) U.S. Cl.
CPC ............ *D07B 1/062* (2013.01); *B60C 9/0007* (2013.01); *B60C 9/005* (2013.01); *D07B 1/0693* (2013.01);
(Continued)

(58) Field of Classification Search
CPC ........ D07B 1/062; D07B 1/0693; D07B 1/16; D07B 1/162; D07B 1/165; D07B 1/167;
(Continued)

(56) References Cited

U.S. PATENT DOCUMENTS 3,133,584 A * 5/1964 Lang ...................... D07B 1/165
152/556
5,139,874 A 8/1992 Starinshak et al.
(Continued)

FOREIGN PATENT DOCUMENTS

BE 900175 A 11/1984
CN 102472001 A 5/2012
(Continued)

OTHER PUBLICATIONS

Extended European Search Report dated Jul. 28, 2022 in European Application No. 19880446.0.
(Continued)

*Primary Examiner* — Shaun R Hurley
(74) *Attorney, Agent, or Firm* — Sughrue Mion, PLLC (57) ABSTRACT

Provided is an elastomer reinforcement cord in which the problem of stress concentration at an interface between an elastomer and a metal cord is solved and the durability is thereby improved. The elastomer reinforcement cord includes metal filaments (1a) and (1b), and a polymer material (3) having a melting point or softening point of 80° C. to 160° C. The elastomer reinforcement cord has a core (11) and at least one sheath layer (12). In a region surrounded by a line connecting the centers of the metal filaments constituting the outermost sheath layer at a cross-section in a direction orthogonal to an axial direction after vulcanization, when a region occupied by other than the metal filaments is defined as a gap region, the polymer material is contained in this gap region, and a filling rate, which is a ratio of the area of the polymer material, is higher than 120%, taking the area of the gap region as 100%.

2 Claims, 4 Drawing Sheets

(52) U.S. Cl.
CPC ......... *D07B 2201/1016* (2013.01); *D07B 2201/104* (2013.01); *D07B 2201/2009* (2013.01); *D07B 2201/201* (2013.01); *D07B 2205/2075* (2013.01); *D07B 2205/3025* (2013.01)

(58) Field of Classification Search
CPC .... D07B 2201/1016; D07B 2201/2009; D02G 3/48; B60C 9/0007; B60C 9/005
See application file for complete search history.

(56) References Cited

U.S. PATENT DOCUMENTS

| | | | |
|---|---|---|---|
| 5,279,695 | A | 1/1994 | Starinshak et al. |
| 5,670,208 | A | 9/1997 | Chikiri et al. |
| 6,334,293 | B1 | 1/2002 | Poethke et al. |
| 2001/0011569 | A1 | 8/2001 | Miyazaki et al. |
| 2002/0053386 | A1* | 5/2002 | Hirachi ............. B60C 9/0007 152/451 |
| 2012/0128972 | A1 | 5/2012 | Custodero et al. |
| 2012/0159919 | A1 | 6/2012 | Gauthier et al. |
| 2013/0220505 | A1 | 8/2013 | Pottier et al. |
| 2014/0008154 | A1 | 1/2014 | Wesson et al. |
| 2014/0044964 | A1 | 2/2014 | Abad et al. |
| 2019/0329593 | A1 | 10/2019 | Shizuku et al. |

FOREIGN PATENT DOCUMENTS

| | | | |
|---|---|---|---|
| CN | 102892949 | A | 1/2013 |
| EP | 1 033 435 | A1 | 9/2000 |
| JP | 47-40188 | Y1 | 12/1972 |
| JP | 60-231884 | A | 11/1985 |
| JP | 5-125675 | A | 5/1993 |
| JP | 5-198212 | A | 8/1993 |
| JP | 2001-214387 | A | 8/2001 |
| JP | 2001-234444 | A | 8/2001 |
| JP | 2009-24268 | A | 2/2009 |
| JP | 2014-509353 | A | 4/2014 |
| JP | 2014-514993 | A | 6/2014 |
| JP | 2018-1749 | A | 1/2018 |

OTHER PUBLICATIONS

Search Report dated May 6, 2022 in Chinese Application No. 201980071464.2.
International Search Report for PCT/JP2019/042419 dated Jan. 28, 2020 (PCT/ISA/210).
European Office Action dated Dec. 12, 2023 in European Application No. 19880446.0.

* cited by examiner

ELASTOMER REINFORCEMENT CORD

CROSS REFERENCE TO RELATED APPLICATIONS

This application is a National Stage of International Application No. PCT/JP2019/042419 filed Oct. 29, 2019, claiming priority based on Japanese Patent Application No. 2018-204361 filed Oct. 30, 2018.

TECHNICAL FIELD

The present invention relates to an elastomer reinforcement cord (hereinafter, also simply referred to as "cord"). More particularly, the present invention relates to an elastomer reinforcement cord that can be preferably used as a reinforcing material of an elastomer article such as a tire.

BACKGROUND ART

Conventionally, steel cords obtained by twisting steel filaments together are used as reinforcing materials in belts of a tire. However, in such steel cords, for example, when the tire is subjected to an external injury and a damage reaching the steel cords is generated, water and the like in the external environment may infiltrate into the gaps between the steel filaments constituting the steel cords and cause the steel cords to be rusted. Accordingly, gaps are formed inside the steel cords to allow a rubber to infiltrate into the steel cords at the time of vulcanization, whereby the water pathway is sealed. Under this circumstance, Patent Document 1 proposes a composite cord obtained by twisting sheath wires each composed of 2 to 12 steel filaments around a core composed of resin filaments having a melting point of 50° C. to lower than 200° C. In this composite cord, rusting of the steel filaments is inhibited by melting the resin filaments at the time of vulcanization and thereby allowing a rubber to permeate between the steel filaments.

RELATED ART DOCUMENT

Patent Document

[Patent Document 1] JP2001-234444A

SUMMARY OF THE INVENTION

Problems to be Solved by the Invention

The surface of a metal cord such as a steel cord is usually plated with brass or the like, and a strong composite reinforcing material is formed by directly adhering such a metal cord with a rubber through vulcanization by means of heat and pressure applied during molding and vulcanization of a tire. However, an elastomer such as a rubber and a metal cord are largely different in terms of the modulus of rigidity, and the difference in rigidity causes stress concentration at an interface between the elastomer and the metal cord. Therefore, once a defect such as detachment occurs at the interface, the detachment or the like may proceed from the defect as an origin, which may result in deterioration of the durability.

In view of the above, an object of the present invention is to provide an elastomer reinforcement cord in which the problem of stress concentration at an interface between an elastomer and a metal cord is solved and the durability is thereby improved.

Means for Solving the Problems

The present inventor intensively studied to discover that the above-described problems can be solved by adopting the below-described constitution for an elastomer reinforcement cord, thereby completing the present invention.

That is, the elastomer reinforcement cord of the present invention is an elastomer reinforcement cord including metal filaments and a polymer material having a melting point or softening point of 80° C. to 160° C.,
wherein
the elastomer reinforcement cord has a core and at least one sheath layer, and
in a region surrounded by a line connecting the centers of the metal filaments constituting the outermost sheath layer at a cross-section in a direction orthogonal to an axial direction after vulcanization, when a region occupied by other than the metal filaments is defined as a gap region, the polymer material is contained in this gap region, and a filling rate, which is a ratio of the area of the polymer material, is higher than 120%, taking the area of the gap region as 100%.

The term "melting point" used herein refers to a melting peak temperature determined by the heat flux differential scanning calorimetry prescribed in JIS K7121. Further, the term "softening point" used herein refers to a value measured by the softening point test method prescribed in JIS K7206(1999).

In the elastomer reinforcement cord of the present invention, it is preferred that the polymer material has a durometer hardness, which is prescribed in JIS K6253(2012), of 50 or higher at 50° C. In the elastomer reinforcement cord of the present invention, it is also preferred that the polymer material contains an ionomer. Further, the elastomer reinforcement cord of the present invention can be formed by twisting the metal filaments with resin filaments containing the polymer material.

Effects of the Invention

According to the present invention, an elastomer reinforcement cord in which the problem of stress concentration at an interface between an elastomer and a metal cord is solved and the durability is thereby improved can be provided.

MODE FOR CARRYING OUT THE INVENTION

The elastomer reinforcement cord of the present invention will now be described in detail referring to the drawings.

Figure 1:
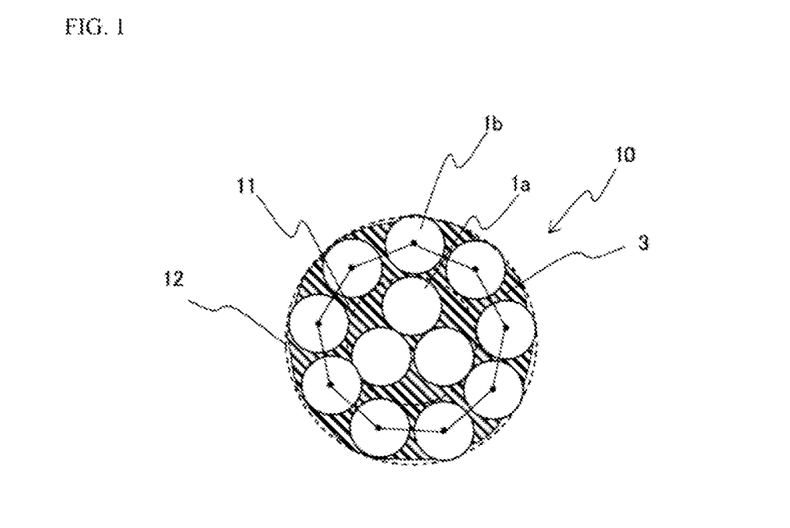
FIG. 1 is a cross-sectional view of an elastomer reinforcement cord according to one preferred embodiment of the present invention in a direction orthogonal to the axial direction after vulcanization.

FIG. 1 is a cross-sectional view of an elastomer reinforcement cord according to one preferred embodiment of the present invention in a direction orthogonal to the axial direction after vulcanization. As illustrated, an elastomer reinforcement cord 10 of the present invention includes metal filaments 1a and 1b, and a polymer material 3 having a melting point or softening point of 80° C. to 160° C.

Further, as illustrated, the elastomer reinforcement cord 10 of the present invention has a core 11 and at least one sheath layer 12 (one sheath layer 12 in the illustrated example). In the illustrated example, the elastomer reinforcement cord 10 of the present invention has a (3+9) structure constituted by the core 11 formed by twisting three metal filaments 1a together, and the sheath layer 12 composed of nine metal filaments 1b that are twisted together around the core 11.

In the cord 10 of the present invention, in a region surrounded by a line connecting the centers of the metal filaments 1b constituting the outermost sheath layer at a cross-section in a direction orthogonal to an axial direction after vulcanization, when a region occupied by other than the metal filaments 1a and 1b is defined as a gap region, it is important that the polymer material 3 be contained in this gap region, and that a filling rate, which is a ratio of the area of the polymer material, be higher than 120%, taking the area of the gap region as 100%. It is noted here that, in the present invention, a filling rate of higher than 100% means that even the outer side of the gap region in the cord 10 is filled with the polymer material 3, i.e. those parts of the surfaces of the metal filaments 1b constituting the outermost sheath layer that correspond to the cord outer periphery, are coated with the polymer material 3.

By controlling the filling rate of the polymer material 3 contained in the gap region inside the cord 10 to be higher than 120%, a layer of the polymer material 3 is formed on the surface of the cord. This allows the polymer material 3, which has an intermediate modulus of rigidity between that of an elastomer such as a rubber and that of a metal cord, to exist between the elastomer and the metal cord that have largely different moduli of rigidity, as a result of which gradual rigidity steps are formed in the order of the elastomer, the polymer material and the metal cord, so that a large rigidity step is alleviated. Consequently, stress concentration that occurs at an interface between the elastomer and the metal cord can be relaxed, whereby the durability can be improved.

When the ratio of the polymer material 3 in the gap region is 120% or lower, a layer of the polymer material 3 is not formed on the cord surface, and stress concentration at an interface between the elastomer and the metal cord cannot be relaxed. The above-described filling rate is preferably higher than 120% but 150% or lower. By controlling the filling rate to be 150% or lower, a resin layer of a thickness effective for reducing a rigidity step can be obtained. In addition, in the below-described production of an elastomer reinforcement cord, a cord in which metal filaments and resin filaments are twisted together in a stable form can be provided, which is preferred.

In the cord 10 of the present invention, the "metal filaments 1a and 1b" each generally refer to a wire-like metal that contains steel, namely iron, as a main component (the mass of iron exceeds 50% by mass with respect to a total mass of each metal filament), and the metal filaments 1a and 1b may each consist of only iron, or may contain a metal other than iron, such as zinc, copper, aluminum, or tin. Particularly, steel filaments are used.

In the cord 10 of the present invention, the surfaces of the metal filaments 1a and 1b may be treated by plating. The type of the plating is not particularly restricted, and examples thereof include zinc plating, copper plating, brass plating, bronze plating, and ternary alloy plating such as copper-zinc-cobalt plating. Thereamong, brass plating is preferred since brass-plated metal filaments exhibit excellent adhesion with a rubber. In the brass plating, the ratio of copper and zinc (copper:zinc) is usually 60:40 to 70:30 based on mass. The thickness of the resulting plated layer is generally 100 nm to 300 nm.

In the cord 10 of the present invention, the diameter, the tensile strength, and the cross-sectional shape of the metal filaments 1a and 1b are not particularly restricted, and may be appropriately selected as desired. For example, the diameter of the metal filaments 1a and 1b may be 0.10 mm to 0.60 mm, and it is preferably 0.12 mm to 0.50 mm. By controlling the diameter of the metal filaments 1a and 1b to be 0.10 mm or larger, an excessive reduction in the size of the voids inside the cord can be inhibited, and the strength necessary for stable production of resin filaments required for filling can be ensured. On the other hand, an increase in the diameter for the purpose of ensuring such strength poses a concern of adversely affecting the cord twisting properties; therefore, a tensile strength required for the metal filaments 1a and 1b can be obtained when the diameter of the metal filaments 1a and 1b is 0.60 mm or less, and this is also advantageous from the standpoint of attaining both satisfactory strength and weight reduction.

Figure 2:
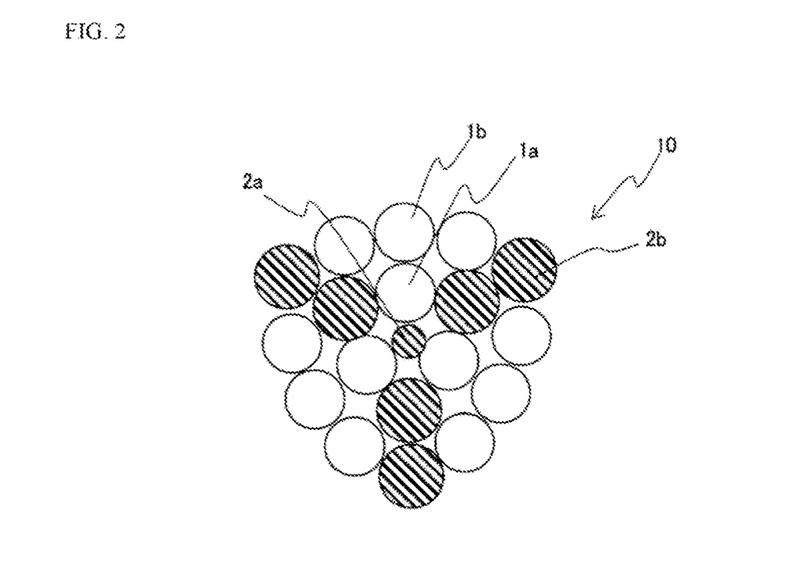
FIG. 2 is one example of a cross-sectional view of an elastomer reinforcement cord according to one preferred embodiment of the present invention in a direction orthogonal to the axial direction before vulcanization.

FIG. 2 shows one example of a cross-sectional view of an elastomer reinforcement cord according to one preferred embodiment of the present invention in a direction orthogonal to the axial direction before vulcanization. As illustrated, in the present invention, at the time of twisting, resin filaments 2a and 2b composed of the polymer material 3 are twisted together with the metal filaments 1a and 1b to form the cord 10 having a layer-strand structure, and the resin filaments 2a and 2b are melted and thereby fluidized by the heat and pressure applied during vulcanization, whereby not only the polymer material 3 is filled into the gap region of the cord 10, but also those parts of the surfaces of the metal filaments 1b constituting the outermost sheath layer of the cord 10 that correspond to the cord outer periphery can be coated with the polymer material 3.

In the present invention, the strand structure of the metal filaments and the resin filaments is not limited to that of the illustrated example as long as the filling rate of the polymer material 3 is in the above-described range after vulcanization. FIG. 2 is an example in which three metal filaments 1a forming a core are twisted together around a single resin filament 2a composed of the polymer material 3, and three resin filaments 2b composed of the polymer material 3, nine metal filaments 1b forming a sheath layer, and three resin filaments 2b composed of the polymer material 3 are sequentially twisted together on the outer side of the core, which example is said to represent a (1r+3+3r+9+3r) structure in which one, three, and three resin filaments (r) are twisted together on the inside, middle, and outside of a metal cord having a (3+9) structure, respectively.

Figure 3:
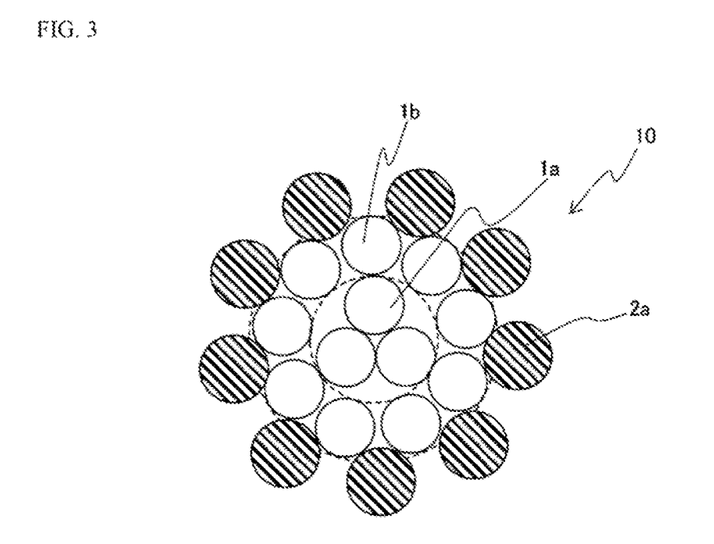
FIG. 3 is another example of a cross-sectional view of an elastomer reinforcement cord according to one preferred embodiment of the present invention in a direction orthogonal to the axial direction before vulcanization.
Figure 4:
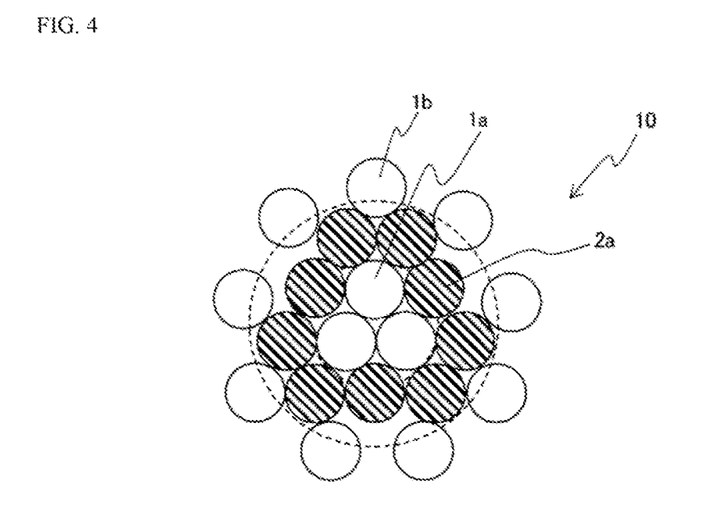
FIG. 4 is yet another example of a cross-sectional view of an elastomer reinforcement cord according to one preferred embodiment of the present invention in a direction orthogonal to the axial direction before vulcanization.
Figure 5:
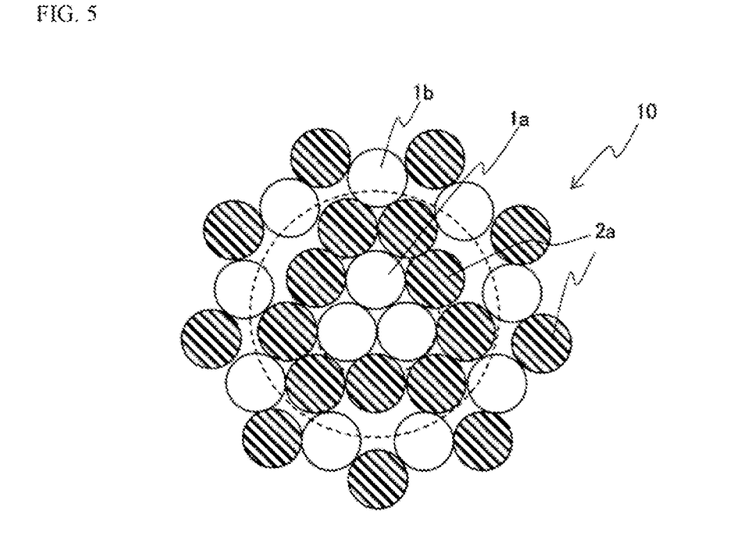
FIG. 5 is yet another example of a cross-sectional view of an elastomer reinforcement cord according to one preferred embodiment of the present invention in a direction orthogonal to the axial direction before vulcanization.
Figure 6:
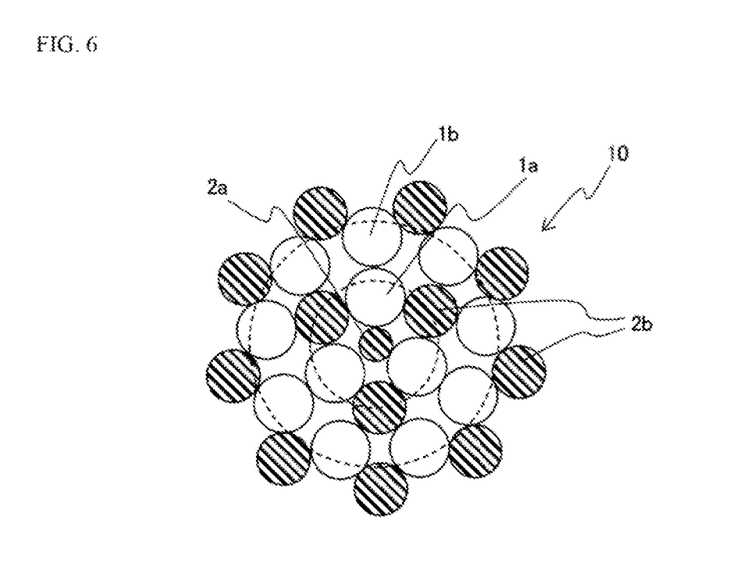
FIG. 6 is yet another example of a cross-sectional view of an elastomer reinforcement cord according to one preferred embodiment of the present invention in a direction orthogonal to the axial direction before vulcanization.

FIGS. 3 to 6 show other examples of a cross-sectional view of an elastomer reinforcement cord according to one preferred embodiment of the present invention in a direction orthogonal to the axial direction before vulcanization. FIG. 3 is an example in which nine metal filaments 1b forming a sheath layer are twisted together around three metal filaments 1a forming a core, and nine resin filaments 2a composed of the polymer material 3 are further twisted together around the sheath layer, which example is said to represent a (3+9+9r) structure in which nine resin filaments (r) are twisted together on the outside of a (3+9) structure. FIG. 4 is an example in which nine resin filaments 2a composed of the polymer material 3 are twisted together around three metal filaments 1a forming a core, and nine metal filaments 1b forming a sheath layer are further twisted together therearound, which example is said to represent a (3+9r+9) structure in which nine resin filaments (r) are twisted together in the middle of a (3+9) structure. Further, FIG. 5 is an example in which nine resin filaments 2a composed of the polymer material 3 are twisted together around three metal filaments 1a forming a core, and nine metal filaments 1b forming a sheath layer and nine resin filaments 2a composed of the polymer material 3 are further twisted together therearound, which example is said to represent a (3+9r+9+9r) structure in which nine resin filaments (r) are twisted together in each of the middle and outside of a (3+9) structure. Moreover, FIG. 6 is an example in which three metal filaments 1a forming a core are twisted together around a single resin filament 2a composed of the polymer material 3 and, on the outside thereof, three resin filaments 2b composed of the polymer material 3, nine metal filaments 1b forming a sheath layer, and nine resin filaments 2b composed of the polymer material 3 are further sequentially twisted together, which example is said to represent a (1r+3+3r+9+9r) structure in which one, three, and nine resin filaments (r) are twisted together on the inside, middle, and outside of a (3+9) structure, respectively.

In the cord 10 of the present invention, with regard to the polymer material 3, the melting point when a resin component contained therein is composed of a single resin, or the softening point when the resin component is composed of a composition containing two or more resins, is preferably 80° C. to 160° C., more preferably 130° C. to 160° C. By using the polymer material 3 whose melting point or softening point satisfies this range, the polymer material 3 is melted or softened during vulcanization and thereby made to flow, so that the polymer material 3 can favorably fill the gaps between the metal filaments in the cord. An excessively high melting point or softening point of the polymer material 3 have effects of, for example, making the polymer material 3 unlikely to be melted or softened during vulcanization and deteriorating the molding workability.

Further, in the cord 10 of the present invention, it is preferred that the polymer material 3 have a durometer hardness, which is prescribed in JIS K6253(2012), of 50 or higher at 50° C. By using such a polymer material, a rigidity step between the elastomer and the metal cord can be effectively alleviated. The reason why the durometer hardness at 50° C. matters in the present invention is because the modulus of rigidity of the polymer material 3 during the use of a tire is important for alleviating the rigidity step, and the internal temperature of the tire during the use is thus taken as a reference.

In the present invention, the polymer material 3 preferably has a melt flow rate (MFR), which is prescribed in JIS K7210, of 7.0 g/10 min or higher. The use of the polymer material 3 having an MFR of 7.0 g/10 min or higher is preferred since, when the resin filaments 2a and 2b are melted or softened during vulcanization, the polymer material 3 inside the cord can be ensured to have sufficient fluidity and is thus sufficiently filled into the gaps between the metal filaments constituting the cord. The MFR of the polymer material is, for example, 16 g/10 min or lower.

As the polymer material 3, for example, an ionomer or an acid-modified resin can be used, or any combination thereof may be used as well. Among acid-modified resins, a resin modified with an acid anhydride of dimer acid, maleic acid, itaconic acid or the like is preferred. By using a maleic acid-modified resin as the polymer material 3, the adhesion of the polymer material 3 with the metal filaments 1a and 1b can be improved.

Examples of the maleic acid-modified resin include maleic anhydride-modified styrene-ethylene-butadiene-styrene block copolymers (SEBS), maleic acid-modified polyethylenes, maleic anhydride-modified ultralow-density polyethylenes, maleic anhydride-modified ethylene-butene-1 copolymers, maleic anhydride-modified ethylene-propylene copolymers, maleic anhydride-modified ethylene-octene, and maleic anhydride-modified propylene, among which a maleic acid-modified polyethylene is particularly preferred. Specific examples of commercially available products thereof include TUFTEC M1943, M1911 and M1913, which are manufactured by Asahi Kasei Corporation, as well as ADMER LB548, NF518, QF551, QF500 and QE060, HI-WAX 4051E, 4252E and 1105A, and TAFMER MH7010 and MH7020, which are manufactured by Mitsui Chemicals, Inc. These may be used singly, or in combination of two or more thereof.

In the cord 10 of the present invention, the polymer material 3 preferably contains an ionomer. By using the polymer material 3 that contains an ionomer, the surfaces of the resin filaments 2a and 2b are smoothened, so that not only the spinnability can be improved but also the lubricity of the resin filaments 2a and 2b in a twisting machine can be improved.

Specific examples of the ionomer include: zinc ion-neutralized ionomers, such as HIMILAN 1554, HIMILAN 1557, HIMILAN 1650, HIMILAN 1652, HIMILAN 1702, HIMILAN 1706 and HIMILAN 1855, as well as sodium ion-neutralized ionomers, such as HIMILAN 1555, HIMILAN 1601, HIMILAN 1605, HIMILAN 1707, HIMILAN 1856 and AM7331, all of which are manufactured by Dow-Mitsui Polychemicals Co., Ltd.; and lithium ion-neutralized ionomers such as SURLYN 7930, and sodium ion-neutralized ionomers such as SURLYN 8120, which are manufactured by DuPont Co., Ltd. These ionomers may be used singly, or in combination of two or more thereof.

Examples of the resin component of the polymer material 3 further include: "NUCREL" Series and "ELVALOY" Series, which are manufactured by Dow-Mitsui Polychemicals Co., Ltd.; "MODIC" Series manufactured by Mitsubishi Chemical Corporation; "OREVAC" Series, "BONDINE" Series, and "LOTRYL" Series, which are manufactured by Arkema K.K.; "REXPEARL" Series manufactured by Japan Polyethylene Corporation; "ACRYFT" Series manufactured by Sumitomo Chemical Co., Ltd.; fluorine-based ionomers manufactured by Asahi Kasei Corporation; and ethylene-ethyl acrylate copolymers manufactured by NUC Corporation. These resin components may be used singly, or in combination of two or more thereof.

In the cord 10 of the present invention, the polymer material 3 may also contain an inorganic filler. As described above, since the resin filaments 2a and 2b are required to be easily melted at a vulcanization temperature, the melting point or softening point of the polymer material 3 is preferably 160° C. or lower. However, the strength of the resin filaments 2a and 2b is reduced when the melting point or softening point of the resin is low and, therefore, the productivity may be deteriorated due to breakage of the resin filaments 2a and 2b during twisting. Accordingly, in the cord 10 of the present invention, the strength of the resin filaments 2a and 2b may be improved by adding an inorganic filler to the resin filaments 2a and 2b. By adding an inorganic filler to the resin filaments 2a and 2b, the surface tackiness of the resin filaments 2a and 2b is reduced, so that the lubricity of the resin filaments 2a and 2b is further improved, which makes twisting of the cord 10 easier.

The amount of the inorganic filler to be added is preferably 0.1 parts by mass to 30 parts by mass, more preferably 0.5 parts by mass to 30 parts by mass, still more preferably 5 parts by mass to 30 parts by mass, particularly preferably 10 parts by mass to 20 parts by mass, with respect to 100 parts by mass of the resin component contained in the polymer material 3. When the amount of the inorganic filler is 0.1 parts by mass or greater with respect to 100 parts by mass of the resin component, the effect of reinforcing the resin filaments 2a and 2b is sufficiently obtained. Meanwhile, by controlling the amount of the inorganic filler to be 30 parts by mass or less, not only saturation of the effect of reinforcing the resin filaments 2a and 2b is inhibited, which is preferred from the cost standpoint as well, but also sufficient dispersibility of the inorganic filler can be ensured and the durability of the resin filaments 2a and 2b can be improved at the same time.

Examples of the inorganic filler include carbon black, silica, aluminum hydroxide, clay, alumina, talc, mica, kaolin, glass balloons, glass beads, calcium carbonate, magnesium carbonate, magnesium hydroxide, magnesium oxide, titanium oxide, potassium titanate, and barium sulfate. These inorganic fillers may be used singly, or in combination of two or more thereof. Thereamong, a carbon black is preferred from the standpoint of reinforcing the resin filaments 2a and 2b. It is noted here that rubber compositions constituting tires usually contain a carbon black. Accordingly, when the cord 10 of the present invention is applied to a tire, the use of a carbon black in the polymer material 3 according to the cord 10 of the present invention improves the compatibility between the polymer material 3 and a rubber composition constituting the tire; therefore, the adhesion between a rubber and the polymer material is expected to be improved as well.

When a carbon black is used, the grade thereof is not particularly restricted, and any carbon black may be selected as appropriate. Examples thereof include SRF, GPF, FEF, HAF, ISAF, and SAF. Particularly, for example, FEF, HAF, ISAF and SAF, which have excellent bending resistance and fracture resistance, can be preferably used, and the carbon black has a nitrogen adsorption specific surface area $N_2SA$ (according to JIS K6217-2:2001) of preferably 30 $m^2/g$ to 150 $m^2/g$, more preferably 35 $m^2/g$ to 130 $m^2/g$.

The polymer material 3 may also contain a thermoplastic resin and/or a thermoplastic elastomer to such an extent that does not hinder the effects of the present invention. Further, a variety of additives, such as an age resistor, an oil, a plasticizer, a color former and a weather resistant agent, may be incorporated (blended) into the polymer material 3.

The resin filaments 2a and 2b can be produced by a known method using the polymer material 3, and the production method is not particularly restricted. For example, the resin filaments 2a and 2b can be produced by kneading the resin component and the like constituting the polymer material 3, and subsequently drawing the resulting resin composition. Further, when an inorganic filler is added to the polymer material 3, a large amount of the inorganic filler is added to the resin component to produce a masterbatch in advance, and the resin filaments 2a and 2b can be produced by adding this masterbatch to the resin component to prepare a resin composition containing the inorganic filler in a prescribed amount, and subsequently drawing the thus obtained resin composition.

In the present invention, the resin filaments 2a and 2b preferably have a diameter of 0.1 mm or larger. By controlling the diameter of the resin filaments 2a and 2b to be 0.1 mm or larger, the resin filaments 2a and 2b are made unlikely to be broken when twisted together with the metal filaments 1a and 1b, and this makes it easier to produce a cord having a desired structure. An upper limit of the diameter of the resin filaments 2a and 2b is not particularly restricted, and can be set as appropriate such that the condition of the filling rate after vulcanization is satisfied. In the present invention, the resin filaments may all have the same diameter, or resin filaments having different diameters may be used in combination.

The structure of the cord 10 of the present invention is not particularly restricted as long as it includes a core and at least one sheath layer, and the cord 10 of the present invention is preferably a cord having a layer-strand structure, such as an (n+m) structure of (1+6), (2+6), (2+8), (3+7), (3+8), (3+9) or the like, an (n+m+1) structure of (3+9+15), (1+6+11) or the like, or a compact structure of (1+6), (2+8), (3+9), (1+6+12) or the like, after vulcanization. Particularly, a cord whose core has a structure in which three metal filaments are twisted together has a structure that is unlikely to allow an elastomer to infiltrate into a void inside the core; however, this is preferred as the structure of the cord 10 of the present invention since the void in the center of the core can be easily filled with the polymer material after vulcanization by arranging the resin filament 2a inside the core as illustrated in FIG. 2.

As described above, the cord 10 of the present invention can be obtained by twisting the metal filaments 1a and 1b with the resin filaments 2a and 2b, subsequently bringing the resin filaments 2a and 2b into a flowable state by heating, and then filling the gaps between the metal filaments 1a and 1b with the polymer material 3 by compression. With regard to the arrangement positions of the resin filaments at the time of twisting the metal filaments with the resin filaments, there is no particular restriction as long as the gaps between the metal filaments can be appropriately filled with the polymer material by heating and the condition of the filling rate after vulcanization can be satisfied.

Because of the improved strength of the resin filaments 2a and 2b, the cord 10 of the present invention can be produced by twisting the resin filaments 2a and 2b together simultaneously with ordinary cord twisting, using a twisting machine or the like that is generally used for the production of a tire steel cord. Therefore, there is no increase in the operation steps, and the productivity is not deteriorated. From the standpoint of inhibiting twist breakage caused by the difference in material between the metal filaments 1a and 1b and the resin filaments 2a and 2b, it is preferred to use a resin material having the highest strength possible for the resin filaments 2a and 2b. Preferably, the resin material has a Rockwell hardness (H scale) of 30 to 150. When the Rockwell hardness is 150 or lower, plastic working of the resin filaments 2a and 2b can be performed easily, and the cord twisting properties are improved. The strength of the resin filaments 2a and 2b can be improved by increasing the draw ratio in the production of the resin filaments 2a and 2b. Further, the resin filaments 2a and 2b preferably have good lubricity in the twisting machine.

The cord 10 of the present invention exhibits excellent adhesion with an elastomer such as a rubber and, therefore, can be preferably used in those parts where a steel cord-rubber complex is conventionally used. Particularly, the cord 10 of the present invention can be preferably used as a reinforcing material of a rubber article, such as a tire, a belt, or a hose. Specific examples of the tire include tires for passenger vehicles, and tires for trucks and buses. A part to which the cord 10 of the present invention is applied is also not particularly restricted, and the cord 10 of the present invention can be used as a carcass ply reinforcing material or a belt reinforcing material. In this case, the cord 10 of the present invention can be used only for local reinforcement of a portion of a tread. The cord 10 of the present invention can also be used only for local reinforcement of, for example, the vicinity of a tread edge, the vicinity of the equatorial plane, the vicinity of groove bottoms or, when other inclined belt layer or circumferential cord layer is included, an end thereof.

The elastomer used for coating the cord 10 of the present invention is also not particularly restricted and, for example, any rubber that is conventionally used for coating a metal cord can be used. In addition, examples of an elastomer that can be preferably used include: diene-based rubbers and hydrogenation products thereof, such as natural rubbers (NR), isoprene rubbers (IR), epoxidized natural rubbers, styrene-butadiene rubbers (SBR), butadiene rubbers (BR, high-cis BR and low-cis BR), nitrile rubbers (NBR), hydrogenated NBRs, and hydrogenated SBRs; olefin-based rubbers, such as ethylene-propylene rubbers (EPDM and EPM), maleic acid-modified ethylene-propylene rubbers (M-EPM), butyl rubbers (IIR), copolymers of isobutylene and an aromatic vinyl or diene monomer, acrylic rubbers (ACM), and ionomers; halogen-containing rubbers, such as Br-IIR, Cl-IIR, brominated isobutylene-p-methylstyrene copolymers (Br-IPMS), chloroprene rubbers (CR), hydrin rubbers (CHR), chlorosulfonated polyethylene rubbers (CSM), chlorinated polyethylene rubbers (CM), and maleic acid-modified chlorinated polyethylene rubbers (M-CM); silicone rubbers, such as methyl vinyl silicone rubber, dimethyl silicone rubber, and methylphenyl vinyl silicone rubber; sulfur-containing rubbers, such as polysulfide rubbers; fluororubbers, such as vinylidene fluoride-based rubbers, fluorine-containing vinyl ether-based rubbers, tetrafluoroethylene-propylene-based rubbers, fluorine-containing silicone-based rubbers, and fluorine-containing phosphazene-based rubbers; and thermoplastic elastomers, such as styrene-based elastomers, olefin-based elastomers, ester-based elastomers, urethane-based elastomers, and polyamide-based elastomers. These elastomers may be used singly, or in combination of two or more thereof by mixing.

EXAMPLES

The present invention will now be described in more detail by way of Examples thereof.

An unvulcanized cord having a (3+9) structure in its steel part is produced by twisting steel filaments of 0.34 mm in diameter with resin filaments. The resin filaments are prepared from a polymer material (softening point: 95° C.) that was obtained by mixing HIMILAN 1702 (manufactured by Dow-Mitsui Polychemicals Co., Ltd.) as an ionomer with TUFTEC M1943 (manufactured by Asahi Kasei Corporation) as a maleic anhydride-modified SEBS at a ratio of 8:2. This polymer material has a durometer hardness, which is prescribed in JIS K6253(2012), of 70 at 50° C. Unvulcanized cords having various filling rates are obtained by changing the diameter of the resin filaments to be used and thereby changing the filling rate of the polymer material.

The thus obtained unvulcanized cords are each coated with a coating rubber to produce cord-rubber complexes, and these complexes are vulcanized at 145° C. for 40 minutes with a pressure equivalent to the pressure applied during tire vulcanization being applied thereto. In the thus vulcanized cords, the distance between the metal filaments constituting the outermost sheath layer is 15 μm.

A graph showing the relationship between the filling rate of the polymer material in the thus obtained vulcanized cord-rubber complexes and the surface coating ratio calculated in accordance with the below-described standard is provided in FIG. 7.

Filling Rate

In a region surrounded by a line connecting the centers of the metal filaments constituting the outermost sheath layer at a cross-section of each of the vulcanized cord-rubber complexes in a direction orthogonal to the axial direction, a region occupied by other than the metal filaments is defined as a gap region. Taking the area of this gap region as 100%, the ratio of the area of the polymer material in percentage is determined as the filling rate.

Surface Coating Ratio

From each of the vulcanized cord-rubber complexes, the cord is taken out and observed from a direction orthogonal to the cord longitudinal direction, and the resin coating ratio of the cord surface is visually evaluated, taking the resin coating ratio of a case where the outer surface of the cord is entirely coated as 100%. A larger value indicates a higher coating ratio.

Figure 7:
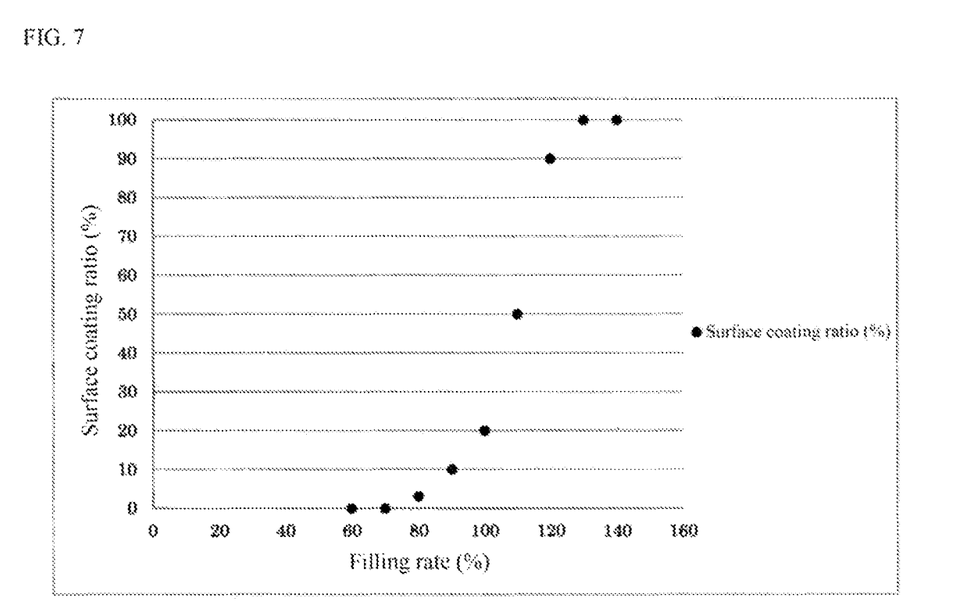
FIG. 7 is a graph showing the relationship between the filling rate and the surface coating ratio in Examples.

As shown in the graph of FIG. 7, the resin coating ratio of the cord surface is substantially 100% when the filling rate of the polymer material in the cord is higher than 120%. Therefore, it is seen that a rigidity step between a cord and a rubber can be alleviated by allowing the polymer material to exist between the cord and the rubber.

DESCRIPTION OF SYMBOLS 1a, 1b: metal filament
2a, 2b: resin filament
3: polymer material
10: elastomer reinforcement cord (cord)
11: core
12: sheath layer

The invention claimed is:
1. An elastomer reinforcement cord, comprising metal filaments and a polymer material having a melting point or softening point of 80° C. to 160° C.,
wherein
the elastomer reinforcement cord has a core and at least one sheath layer, and
when in a region surrounded by a line connecting the centers of the metal filaments constituting the outer- most sheath layer at a cross-section in a direction orthogonal to an axial direction after vulcanization, a region occupied by other than the metal filaments is defined as a gap region, the polymer material is contained in this gap region, and a filling rate, which is a ratio of the area of the polymer material, is higher than 120%, taking the area of the gap region as 100%, and wherein the polymer material comprises an ionomer and an acid-modified resin.

2. The elastomer reinforcement cord according to claim 1, wherein the elastomer reinforcement cord is formed by twisting the metal filaments with resin filaments containing the polymer material.

* * * * *